(12) United States Patent
Wen

(10) Patent No.: US 9,796,040 B2
(45) Date of Patent: Oct. 24, 2017

(54) MELT CUTTER

(71) Applicant: Yuan-Hung Wen, Changhua County (TW)

(72) Inventor: Yuan-Hung Wen, Changhua County (TW)

( * ) Notice: Subject to any disclaimer, the term of this patent is extended or adjusted under 35 U.S.C. 154(b) by 283 days.

(21) Appl. No.: 14/703,315

(22) Filed: May 4, 2015

(65) Prior Publication Data

US 2015/0231731 A1 Aug. 20, 2015

Related U.S. Application Data

(63) Continuation-in-part of application No. 13/663,402, filed on Oct. 29, 2012, now abandoned.

(51) Int. Cl.
  *B23K 11/22* (2006.01)
  *B23K 11/28* (2006.01)

(52) U.S. Cl.
  CPC ............. *B23K 11/22* (2013.01); *B23K 11/28* (2013.01)

(58) Field of Classification Search
  CPC ...... B23K 11/28; B23K 11/22; H02G 1/1223; H02G 1/1292; H01R 4/2429
  USPC ............ 219/68; 30/140, 345, 90.1; 606/159, 606/108; 81/9.43
  See application file for complete search history.

(56) References Cited

U.S. PATENT DOCUMENTS

| | | | |
|---|---|---|---|
| 2,680,187 A | 6/1954 | Anton | |
| 2,749,417 A * | 6/1956 | Griskell | B23K 11/28 219/90 |
| 3,199,383 A | 8/1965 | Gudmestad | |
| 3,765,276 A | 10/1973 | Pollitt | |
| 4,033,406 A | 7/1977 | Basiulis | |
| 4,108,028 A * | 8/1978 | Perrino | H02G 1/1214 30/90.1 |
| 4,110,593 A * | 8/1978 | Crooks | H01H 11/043 219/86.21 |
| 4,568,818 A | 2/1986 | Ikemoto | |
| 4,924,070 A | 5/1990 | Friedman | |
| 5,435,029 A * | 7/1995 | Carlson, Jr. | H02G 1/1292 140/123 |
| 5,824,984 A * | 10/1998 | Morrow | B23K 11/22 140/139 |

(Continued)

FOREIGN PATENT DOCUMENTS

TW  M425753  4/2012

*Primary Examiner* — Dana Ross
*Assistant Examiner* — Kuangyue Chen
(74) *Attorney, Agent, or Firm* — Muncy, Geissler, Olds & Lowe, P.C.

(57) ABSTRACT

A melt cutter includes a case, an electricity-connecting portion, a heating device, a working portion, a control portion, and a heat-dissipating device. The case has a heat-dissipating zone. The electricity-connecting portion is disposed in the case for connecting with an electricity source. The working portion is disposed in the case and has a gap with changeable size for clamping an object. The control portion alternatively triggers the heating device to heat and to transmit heat to the working portion, and it also reduces the size of the gap for melting and cutting the object. The heat-dissipating device is disposed at the heat-dissipating zone and is electrically connected with the electricity-connecting portion. Thereby, the heat-dissipating device helps air communication between interior and exterior of the case.

11 Claims, 3 Drawing Sheets

(56) References Cited

U.S. PATENT DOCUMENTS

| | | |
|---|---|---|
| 7,038,171 B2 | 5/2006 | Osada et al. |
| 2004/0263008 A1* | 12/2004 | Voigt ................... B25F 5/008 |
| | | 310/58 |
| 2009/0126964 A1* | 5/2009 | Schroeder ............... B25F 5/02 |
| | | 173/217 |
| 2011/0141686 A1 | 6/2011 | Liu |

* cited by examiner

MELT CUTTER

The present invention is a CIP of application Ser. No. 13/663,402, filed Oct. 29, 2012, the entire contents of which are hereby incorporated by reference.

BACKGROUND OF THE INVENTION

Field of the Invention
Description of the Prior Art

Conventionally, a metal wire is cut by cutter with high hardness. However, the metal wire also has a quite high hardness, so cutting operation may be very dangerous and difficult.

A melt cutter to solve the previous problems is disclosed in patent TW M425753 by the inventor of the present invention. The metal wire is simultaneously melted during cutting to reduce time of operating. To prevent the heater from overheated, the melt cutter is usually disposed with automatic electricity-cutting mechanism. However, when the electricity is cut, re-heating to the working temperature may be time-consuming, and efficiency is reduced.

U.S. Pat. No. 3,765,276 discloses that the wire is cut mechanically by the cutter jaws. Besides, the wire clamping jaws have no function about cutting the wire. In addition, the clamping jaws and the cutter jaws are all not heated by any heating device. That is to say, the wire is cut by the scissor-like cutter jaws mechanically without being heated. It is time-consuming and efficiency is reduced, too.

US2011/0141686 discloses just a heat dissipation apparatus for electronic device, wherein the heat dissipation apparatus has no heat-melting-cutting mechanism but merely has a fan. It is time-consuming to cut a metal wire and has a complicated structure.

SUMMARY OF THE INVENTION

The main object of the present invention is to provide a melt cutter to improve heat-dissipation.

To achieve the above and other objects, a melt cutter of the present invention includes a case, an electricity-connecting portion, a heating device, a working portion, a control portion, and a heat-dissipating device.

The case includes a flat top wall and a ridged shell portion ridging outwardly from the flat top wall, the ridged shell portion forms a heat-dissipating zone which is a space inside the ridged shell portion and extends outwardly relatively beyond the flat top wall, and the heat-dissipating zone forms at least one opening. The case further forms a plurality of holes for facilitating air communication between interior and exterior of the case.

The electricity-connecting portion is disposed on an end of the case for detachably connecting with an electricity source from an outside of the case to provide electricity to the heating device and the heat-dissipating device.

The heating device is disposed in the case and is electrically connected with the electricity-connecting portion. The heating device further has a micro-switch.

The working portion is disposed in the case and includes an upper working piece and a lower working piece. A gap is defined between the upper and the lower working pieces for clamping an object.

The control portion is pivoted to the case within the case, one end of the control portion extends outside the case and is pivotally operable from an outside of the case, and alternatively triggers the heating device to heat and transmit heat to the working portion so that temperatures of the upper working piece and the lower working piece are raised to higher than the melting point of the object to be cut. The control portion also triggers the upper and the lower working pieces to approach each other so as to reduce the gap to melt and cut the object off.

The heat-dissipating device is disposed at the heat-dissipating zone of the case and is electrically connected with the electricity-connecting portion. The heat-dissipating device is connected with the micro-switch and includes a fan. When the micro-switch is triggered by the control portion, the fan is also triggered to rotate. The heat-dissipating device includes a fan, the fan is attached to the ridged shell portion and within the heat-dissipating zone, a flow-passing side of the fan facing inwardly is tilted to the flat top wall, the flat top wall, a part of the ridged shell portion connected with the flat top wall and the flow-passing side of the fan form a remaining space, the control portion is pivoted to the case between the remaining space and the working portion, the fan is driven to rotate when the micro-switch is triggered by the control portion.

Thereby, the melt cutter of the present invention has an improved performance of heat-dissipation due to the heat-dissipating device which facilitates air communication between the interior and the exterior of the case. Thus, a user may not feel uncomfortable due to heat during operating.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2A is a partial enlargement drawing showing a heat-dissipating device of the present invention.

DETAILED DESCRIPTION OF THE PREFERRED EMBODIMENTS

Figure 1:
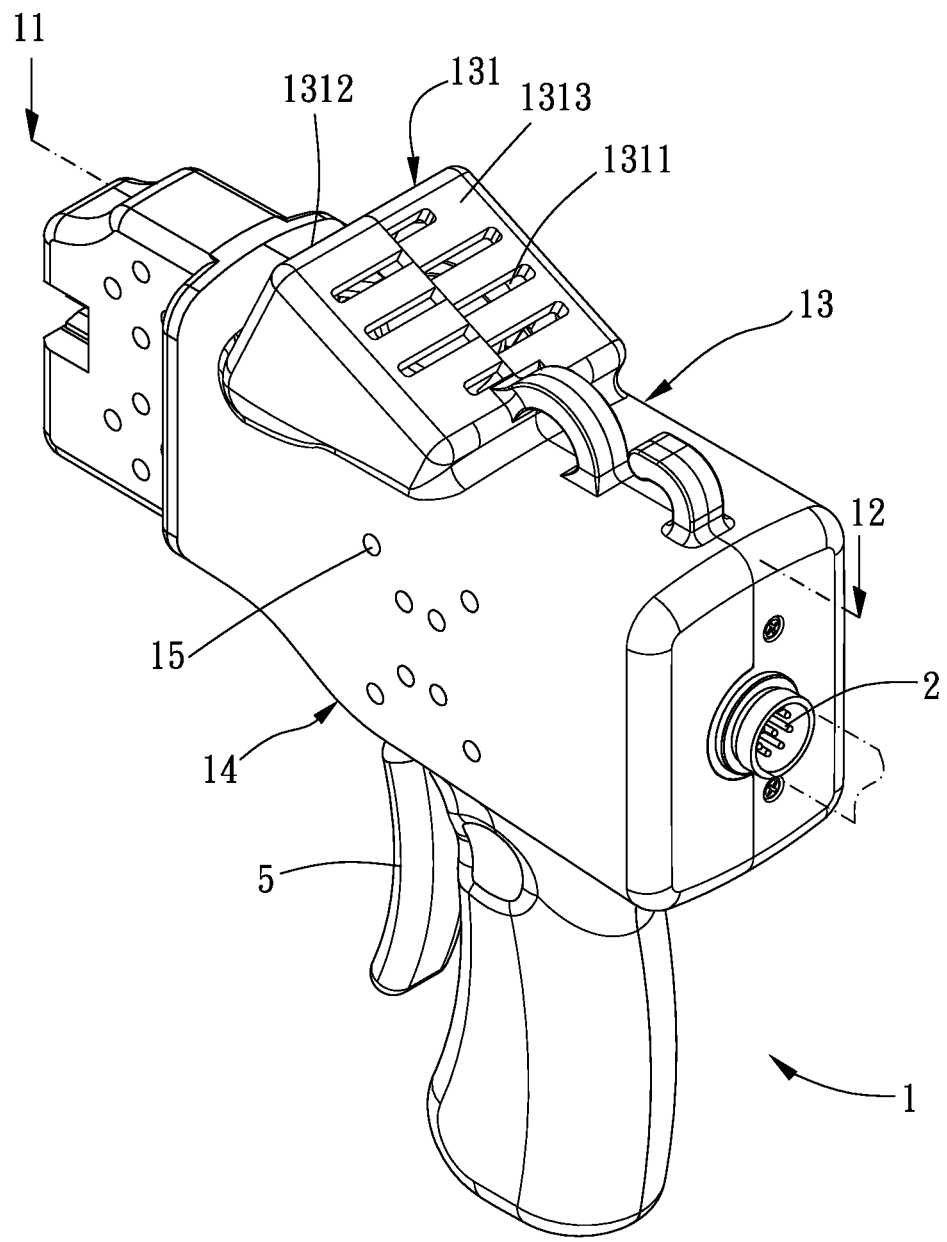
FIG. 1 is a stereogram of the present invention.
Figure 2:
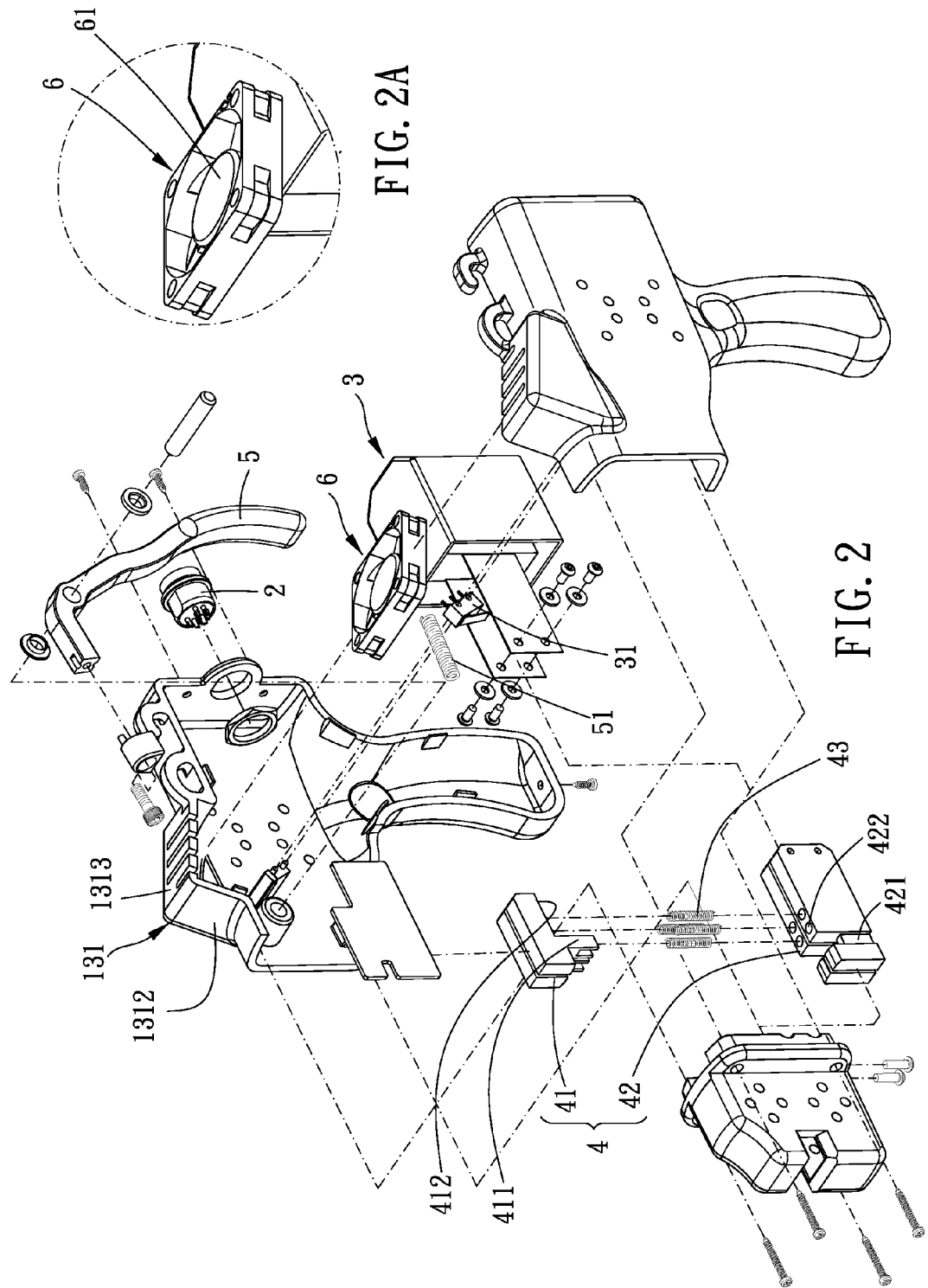
FIG. 2 is a breakdown drawing of the present invention.

Please refer to FIG. 1 and FIG. 2. The melt cutter of the present invention includes a case 1, an electricity-connecting portion 2, a heating device 3, a working portion 4, a control portion 5, and a heat-dissipating device 6.

The case 1 has a first end 11 and an opposite second end 12 and also has a top portion 13 and a bottom portion 14. The case 1 further includes a flat top wall 141 provided on the top portion 13 and a ridged shell portion 142 ridging outwardly from the flat top wall 141, the ridged shell portion 142 forms a heat-dissipating zone 131 which is a space inside the ridged shell portion 142 and extends outwardly relatively beyond the flat top wall 141. The ridged shell portion 142 is protrodingly formed above the top portion 13, and the heat-dissipating zone 131 forms at least one opening 1311 and has a first face 1312 and a second face 1313 perpendicular to the first face 1312. The opening 1311 is located on the second face 1313. Preferably, a receiving room is formed between the first face 1312 and the second face 1313. A line is defined by the first end 11 and the second end 12. An acute angle between the line and the first face 1312 is larger than an acute angle between the line and the second face 1313. The second face 1313 substantially faces to the second end 12. On the other hand, the case 1 is made of highly heat-resistant material. Also, the case 1 further has a plurality of holes 15 facilitating air communication between interior and exterior of the case 1.

The electricity-connecting portion 2 is disposed at the second end 12 of the case 1. More preferably, the electricity-connecting portion 2 is partially received in the case 1 and partially extends out of the case 1 for detachably connecting with an electricity source from an outside of the case 1. The electricity-connecting portion 2 further provides electricity to the heating device 3 and the heat-dissipating device 6.

The heating device 3 is disposed in the case 1 near the second end 12. The heating device 3 is electrically connected with the electricity-connecting portion 2. Practically, a high-frequency heater or other types of heaters can be employed as the heating device 3. Besides, the heating device 3 has a micro-switch 31.

The working portion 4 is disposed in the case 1 and is located at the first end 11. The heat-dissipating zone 131 is located between the working portion 4 and the heating device 3. The working portion 4 includes an upper working piece 41 and a lower working piece 42 which are both connected with the heating device 3. A gap is formed between the upper and the lower working pieces 41,42 for clamping an object to be cut, such as a metal wire. The following paragraphs are recited about an example for cutting a metal wire. Besides, the working portion 4 further includes at least one elastic element between the upper working piece and the lower working piece abutting thereagainst so that the upper and the lower working pieces have a tendency to move away from each other to form the gap.

The control portion 5 is pivoted to the case 1 within the case 1, one end of the control portion 5 extending outside the case 1 and pivotally operable from an outside of the case 1, and the heat-dissipating zone 131 are located at two opposite ends of the case 1. Preferably, the control portion 5 is located at the bottom portion 14 of the case 1 and is connected with the micro-switch 31. The control portion 5 is able to alternatively trigger the micro-switch 31 for further triggering the heating device 3 to heat and to conduct heat to the working portion 4 (the upper working piece 41 and the lower working piece 42) so that temperatures of the upper working piece 41 and the lower working piece 42 are raised to higher than the melting point of the object to be cut. The control portion 5 has an elastic element 51 connected the control portion 5 and the case 1 so that the control portion 5 tends to stay at a predetermined position. An end of the control portion 5 alternatively pushes the upper working piece 41 so that the upper working piece 41 and the lower working piece 42 approach each other to reduce the gap for melting the object till the object is cut off.

The heat-dissipating device 6 is disposed at the heat-dissipating zone 131 of the case 1 and is electrically connected with the electricity-connecting portion 2. The heat-dissipating device 6 is able to facilitate air communication between interior and exterior of the case 1. Practically, the heat-dissipating device 6 includes a fan 61, as shown in FIG. 2A. The fan 61 is attached to the ridged shell portion 142 and within the heat-dissipating zone 131, a flow-passing side 611 of the fan 61 facing inwardly is tilted to the flat top wall 141. The flat top wall 141, a part of the ridged shell portion 142 connected with the flat top wall 141 and the flow-passing side 611 of the fan 61 form a remaining space 612. The control portion 5 is pivoted to the case 1 between the remaining space 612 and the working portion 4. The fan 61 is driven to rotate when the micro-switch is triggered by the control portion 5. The fan 61 is received in a receiving room between the first face 1312 and the second face 1313. The fan 61 is attached substantially parallel to the second face 1313 and faces toward the second face 1313. The fan 61 is able to blow toward the working portion 4 and the heating device 3 to cool them down. Of course, the fan 61 can be reversely disposed to facilitate heat inside the case 1 to be drawn out via the openings 1311 on the second face 1313. More specifically, the heat-dissipating device 6 is connected with the micro-switch 31 correspondingly under the remaining space 612. When the micro-switch 31 is triggered by the control portion 5, the fan 61 is simultaneously triggered to rotate. Also, another switch is optionally disposed on the case for launching or shutting down the heat-dissipating device. The remaining space 612 facilitates air flow and enhances heat dissipation efficiency.

Figure 3:
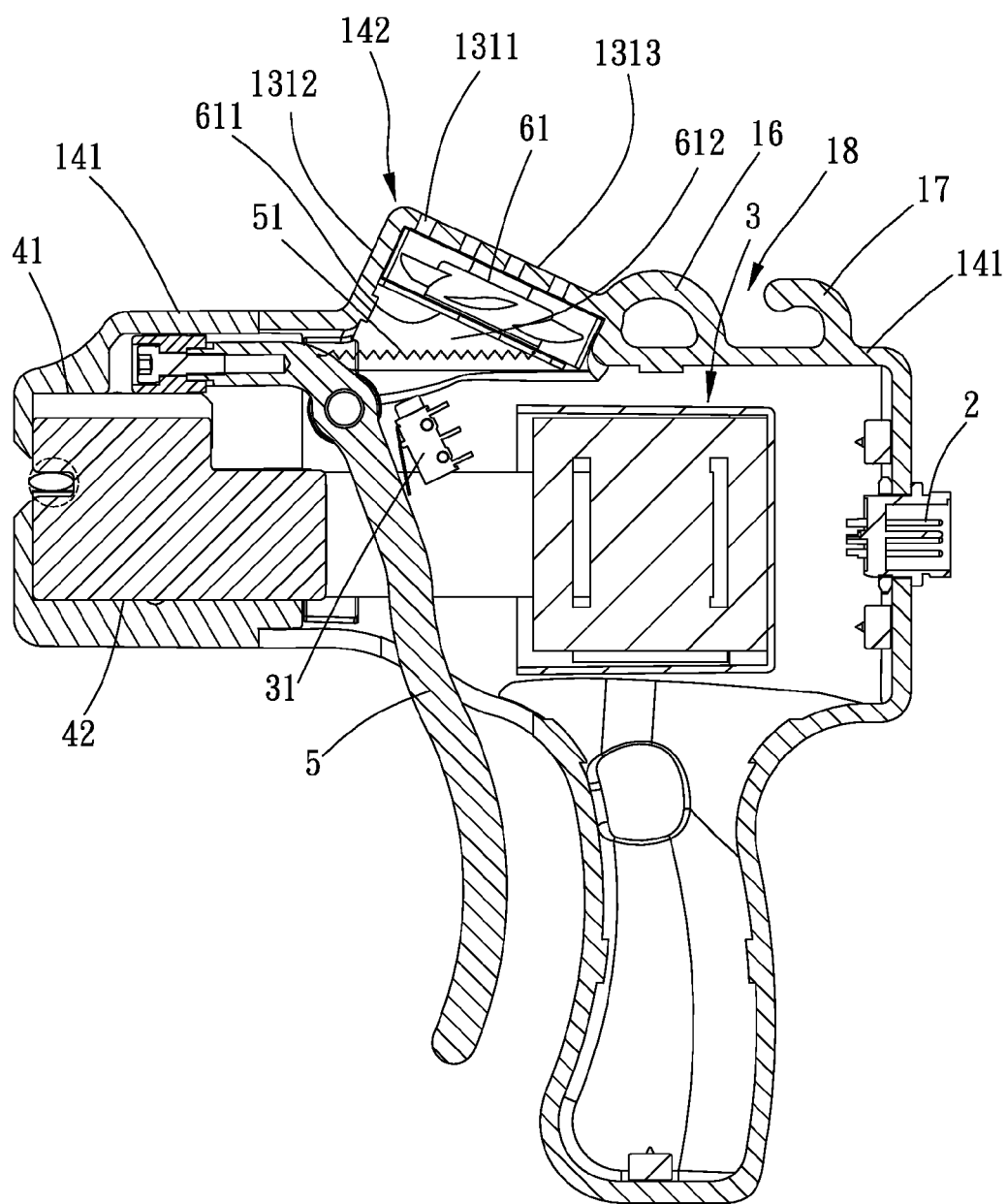
FIG. 3 is a profile of the present invention.

In practice, as shown in FIG. 3, when the control portion 5 is at an original state, the control portion 5 is kept at a predetermined position due to the elastic element 51 and doesn't push the upper working piece 41, and the micro-switch 31 is not triggered. When using, the object to be cut is placed at the gap between the upper and the lower working pieces 41,42. When the control portion 5 is exerted with force, the micro-switch 31 is triggered by the control portion 5 to heat and conduct heat to the upper and the lower working pieces 41,42. Also, the micro-switch 31 triggers the fan 61 to rotate so as to cool down the working portion or the heating device 3 or to draw hot air inside out via the openings 1311. At the same time, the upper working piece 41 is pushed to approach the lower working piece 42 by the control portion 5, and the object is melted and cut by the upper and the lower working pieces 41,42. When cutting is completed, the control portion 5 can be released by a user, and the control portion 5 moves back to the predetermined position. Thus, the micro-switch 31 is not triggered, and the heating device 3 stops heating. Also, the upper working piece 41 moves away from the lower working piece 42 to form the gap again.

Preferably, the case 1 further includes an arched connecting bridge 16 fixedly connected between an end of the ridged shell portion 142 and the flat top wall 141 so as to form a through hole. The case 1 further includes a hook arm 17 hooking toward the arched connecting bridge 16, and a free end of the hook arm 17 and the arched connecting bridge 16 form a gap 18 therebetween. The arched connecting bridge 16 and the hook arm 17 are helpful to hanging.

The upper working piece 41 has a plurality of protruding legs 411, and the lower working piece 42 has a guiding necked portion 421 which is slidable between the protruding legs 411. The upper working piece 41 has an abutting face 412, the lower working piece 42 has a plurality of holes 422 corresponding to the abutting face 412, and a plurality of elastic members 43 are inserted in the holes 422 respectively and abut against the abutting face 412. The cooperation of the protruding legs 411 and guiding necked portion 421 facilitates the approach and clamping effecting of the upper working piece 41 and the lower working piece 42. The elastic members 43 facilitate the repositioning of the upper working piece 41 and the lower working piece 42.

In conclusion, the heat-dissipating device is able to dissipate heat from the heating device, the heat-conducting path, and the working portion. Also, hot air always moves upward, so the heat-dissipating device disposed at the top portion effectively facilitates hot air to be discharged. Moreover, the holes on the case helps bring fresh cool air outside into the case for further cooling.

In addition, the case is also cooled down to prevent user from feeling uncomfortable due to heat. Furthermore, the heat-dissipating device and the control portion are disposed at two opposite ends of the case, so hands of user may not be burned by hot air discharged out.

More importantly, the fan of the heat-dissipating device faces toward the second face, and the angle of the first face is larger than the angle of the second face. Thus, the second face substantially faces to the second end so that the discharged hot air may not be dissipated toward the first end, so the working portion at the first end may not be overheated.

What is claimed is:

1. A melt cutter, including:
   a case, including a flat top wall and a ridged shell portion ridging outwardly from the flat top wall, the ridged shell portion forming a heat-dissipating zone which is a space inside the ridged shell portion and extends outwardly relatively beyond the flat top wall;
   an electricity-connecting portion, disposed on the case, being adapted for detachably connecting with an electricity source from an outside of the case;
   a heating device, disposed in the case, being electrically connected with the electricity-connecting portion;
   a working portion, disposed in the case, including an upper working piece and a lower working piece, a gap being formed between the upper and lower working pieces for clamping an object to be cut;
   a control portion, pivoted to the case within the case, one end of the control portion extending outside the case and pivotally operable from an outside of the case,
   for triggering the heating device to heat and to transmit heat to the upper working piece and the lower working piece so that temperatures of the upper working piece and the lower working piece are raised to higher than the melting point of the object to be cut so as to drive the upper and the lower working pieces to approach each other to reduce the gap, thereby the object to be cut being cut off in a means of melting;
   a heat-dissipating device, disposed in the heat-dissipating zone of the case, the heat-dissipating device being electrically connected with the electricity-connecting portion and facilitating air communication between interior of the case and outside of the case, wherein the heat-dissipating device includes a fan, the fan is attached to the ridged shell portion and within the heat-dissipating zone, a side of the fan facing inwardly is tilted to the flat top wall, the flat top wall, a part of the ridged shell portion connected with the flat top wall and the side of the fan form a remaining space, the control portion is pivoted to the case between the remaining space and the working portion, the fan is driven to rotate when a micro-switch is triggered by the control portion;
   wherein the upper working piece has a plurality of protruding legs, and the lower working piece has a guiding necked portion which is slidable between the protruding legs.

2. The melt cutter of claim 1, wherein the heat-dissipating zone has at least one opening.

3. The melt cutter of claim 1, wherein the heating device further has the micro-switch correspondingly under the remaining space, the control portion is able to trigger the micro-switch to further trigger the heating device to heat.

4. The melt cutter of claim 3, wherein the micro-switch is connected with the heat-dissipating device.

5. The melt cutter of claim 1, wherein the case forms a plurality of holes for facilitating air communication between the interior of the case and the outside of the case.

6. The melt cutter of claim 1, wherein the case has a first end and a second end, the case also has a top portion and a bottom portion, the working portion is located at the first end, the heating device is located near the second end, the heat-dissipating zone is located between the working portion and the heating device, the control portion is located at the bottom portion of the case, the top portion is provided with the flat top wall.

7. The melt cutter of claim 6, wherein the heat-dissipating zone forms at least one opening, the ridged shell portion has a first face and a second face which is perpendicular to the first face, the opening is formed on the second face, the fan is attached parallel to the second face.

8. The melt cutter of claim 7, wherein a line is defined by the first end and the second end, an acute angle between the line and the first face is larger than an acute angle between the line and the second face.

9. The melt cutter of claim 1, wherein the case further includes an arched connecting bridge fixedly connected between an end of the ridged shell portion and the flat top wall so as to form a through hole.

10. The melt cutter of claim 9, wherein the case further includes a hook arm hooking toward the arched connecting bridge, and a free end of the hook arm and the arched connecting bridge form a gap therebetween.

11. The melt cutter of claim 1, wherein the upper working piece has an abutting face, the lower working piece has a plurality of holes corresponding to the abutting face, and a plurality of elastic members are inserted in the holes respectively and abut against the abutting face.

* * * * *